(12) United States Patent
Petena

(10) Patent No.: US 11,660,804 B2
(45) Date of Patent: May 30, 2023

(54) DEVICE FOR EXPANDING AND SHAPING THE END OF PIPES AND AN EXTRACTING MEMBER FOR USE WITH SUCH A DEVICE

(71) Applicant: AQUATECHNIK GROUP S.P.A., Magnago (IT)

(72) Inventor: Lino Petena, Bergamo (IT)

(73) Assignee: AQUATECHNIK GROUP S.P.A., Magnago (IT)

( * ) Notice: Subject to any disclaimer, the term of this patent is extended or adjusted under 35 U.S.C. 154(b) by 421 days.

(21) Appl. No.: 16/771,946

(22) PCT Filed: Dec. 5, 2018

(86) PCT No.: PCT/IB2018/059667
§ 371 (c)(1),
(2) Date: Jun. 11, 2020

(87) PCT Pub. No.: WO2019/116170
PCT Pub. Date: Jun. 20, 2019

(65) Prior Publication Data
US 2020/0391274 A1   Dec. 17, 2020

(30) Foreign Application Priority Data
Dec. 12, 2017   (IT) .......................... 102017000142954

(51) Int. Cl.
*B21D 41/02*   (2006.01)
*B29C 57/06*   (2006.01)
(Continued)

(52) U.S. Cl.
CPC ............ *B29C 57/06* (2013.01); *B21D 39/203* (2013.01); *B21D 41/021* (2013.01);
(Continued)

(58) Field of Classification Search
CPC ...................................................... B29C 57/06
See application file for complete search history.

(56) References Cited

U.S. PATENT DOCUMENTS

| | | | | |
|---|---|---|---|---|
| 2,672,175 A | * | 3/1954 | Howard | B21D 41/026 72/393 |
| 2,999,529 A | * | 9/1961 | Wlodzimierz Rast | B21D 41/026 72/393 |

(Continued)

FOREIGN PATENT DOCUMENTS

| | | |
|---|---|---|
| EP | 1166951 A1 | 1/2002 |
| EP | 1179409 A2 | 2/2002 |

(Continued)

*Primary Examiner* — Atul P. Khare
(74) *Attorney, Agent, or Firm* — Dickinson Wright PLLC; Andrew D. Dorisio

(57) ABSTRACT

A device for expanding and shaping the end of pipes includes a head with means for connecting to an elastically deformable expanding element with a first elongated portion for being introduced into the end of the pipe, the expanding element having a central through hole, and an extracting member including an expansion head suitable to move from outside to inside the central through hole of the expanding element or the other way round, so as to cause deformation, or to allow the expanding element to elastically return to an undeformed state, means for moving said extracting member, wherein: —the connecting means is suitable for steadily constraining the expanding element to the head for a plurality of different pipes and to allow the expanding element to be replaced when worn out, the elongated portion of the expanding element is made of an elastically deformable polyurethane plastic material having certain characteristics.

16 Claims, 8 Drawing Sheets

(51) Int. Cl.
- B29C 33/50 (2006.01)
- B29C 33/42 (2006.01)
- B29C 33/40 (2006.01)
- B21D 39/20 (2006.01)
- C08K 5/098 (2006.01)
- C08L 75/04 (2006.01)

(52) U.S. Cl.
CPC ......... B21D 41/026 (2013.01); B21D 41/028 (2013.01); B29C 33/405 (2013.01); B29C 33/42 (2013.01); B29C 33/505 (2013.01); C08K 5/098 (2013.01); C08L 75/04 (2013.01)

(56) References Cited

U.S. PATENT DOCUMENTS

| | | | | |
|---|---|---|---|---|
| 3,385,087 A | * | 5/1968 | Huth | B21D 41/02 72/31.06 |
| 4,043,171 A | * | 8/1977 | Brookman | B21C 37/292 72/393 |
| 4,198,844 A | * | 4/1980 | Lowe | B21D 41/02 72/393 |
| 4,308,736 A | | 1/1982 | Lowe et al. | |
| 4,494,398 A | * | 1/1985 | Svoboda | B21D 39/20 D15/199 |
| 4,663,837 A | * | 5/1987 | Hoeffken | F24H 3/087 29/726 |
| 4,893,390 A | * | 1/1990 | Hoeffken | B21D 39/06 29/523 |
| 10,940,521 B2 | * | 3/2021 | Myrhum, Jr. | B21D 39/20 |

FOREIGN PATENT DOCUMENTS

| | | |
|---|---|---|
| EP | 2130664 A1 | 12/2009 |
| WO | WO-8400120 A1 * | 1/1984 ........... B21D 41/026 |

* cited by examiner

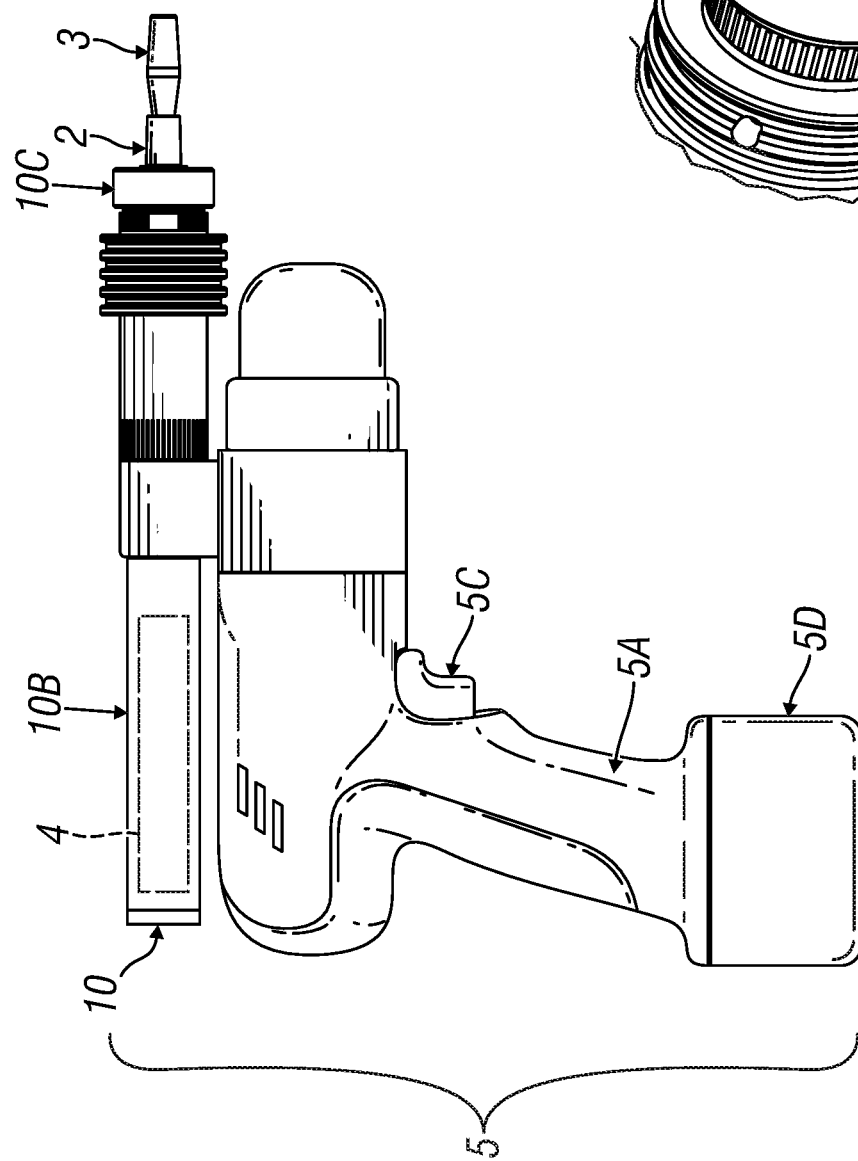
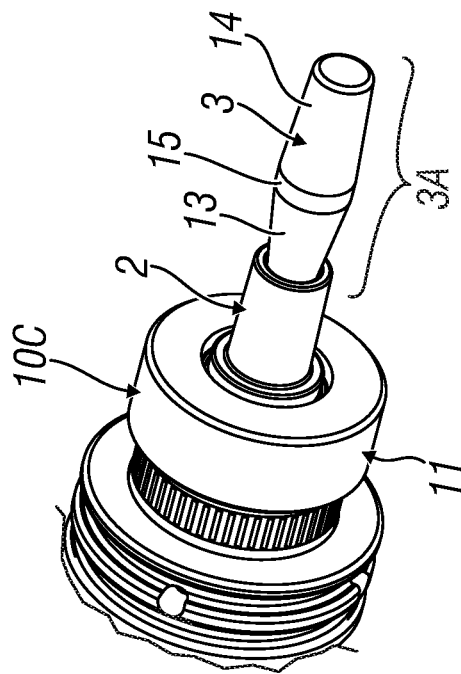
Fig. 1
Fig. 2

Fig. 5

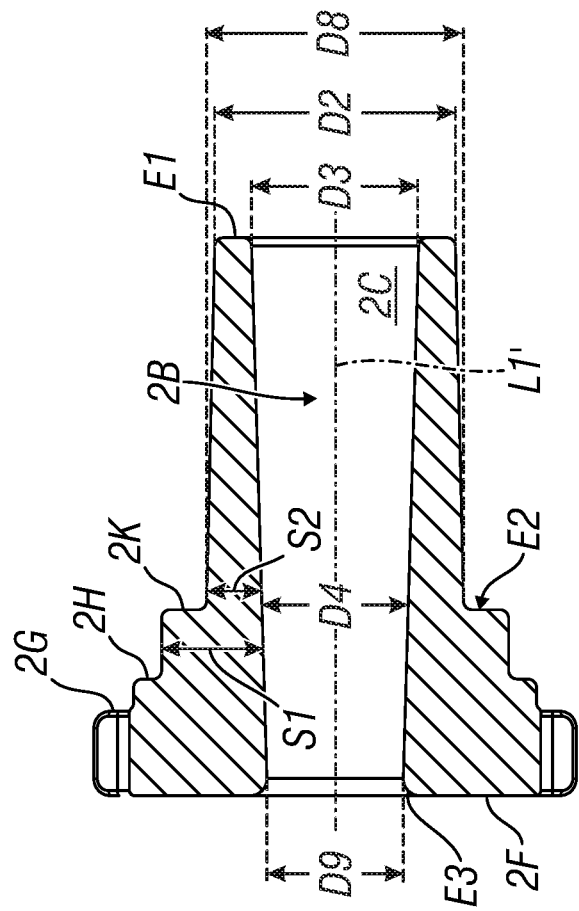
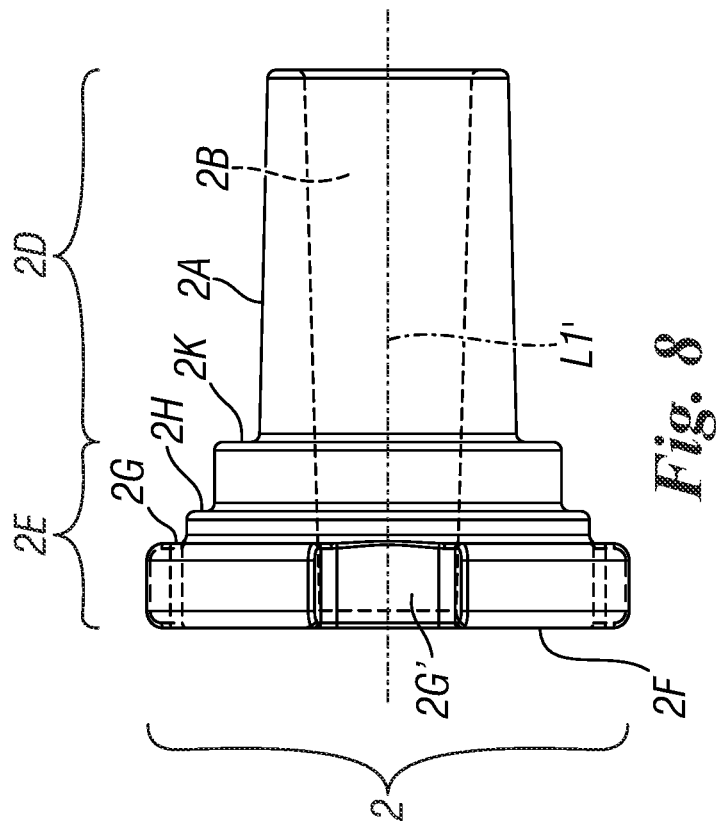
Fig. 8
Fig. 9

DEVICE FOR EXPANDING AND SHAPING THE END OF PIPES AND AN EXTRACTING MEMBER FOR USE WITH SUCH A DEVICE

FIELD OF THE INVENTION

The present invention relates to a device for expanding and shaping the end of pipes, according to the pre-characterising portion of claim 1.

BACKGROUND

Within the present context, pipes are to be understood as pipes made of deformable plastic material or of a multilayer comprising materials of different nature, such as plastics and metals, for example of the type comprising outer and inner layers of crosslinked Polyethylene (PE-X) and an intermediate layer of aluminium. The material forming said pipes is such as to enable their extremal portions to be irreversibly deformed, so as to change their outer diameter by a value between +10% and +20% of the original undeformed diameter, so that it is possible to introduce an usual connecting element into said ends.

In the implementation of hydraulic, fluid-power and pneumatic facilities, it has long been known how to use plastic or multilayer pipes which are connected to one another and/or to their relevant equipment (for example hydraulic-healthcare facilities) through special fittings which have to be sealingly constrained to pipe ends.

In order to ease the introduction of the fitting into a pipe end, said end is usually expanded compared to the "normal" section of the pipe, using special equipment envisaging the use of expanding tools. As a rule, the deformed end is "glass-shaped". EP2130664 A1 describes an expander comprising a plurality of expandable sectors which are radially expanded to provide a pipe end with a glass shape. The expandable sectors must be implemented with the utmost care to prevent that, during the process of expansion of the pipe end, the pipe is damaged or at any rate that an uneven expansion is achieved, so that a sealed connection with the relevant fitting is not provided.

An alternative solution to expand pipe ends is described in EP1179409 A2, which provides that a bushing is introduced into the pipe end to be expanded, which, once introduced into the pipe end, is expanded through an appropriate expanding member. The bushing described in EP1179409 A2 is made of an elastically deformable plastic material, namely a material which, once deformed, permanently preserves the shape and size achieved by said deformation. The use of a plastically deformable material is required because, according to the teachings of EP1179409 A2, the deformed bushing remains permanently constrained to the inner surface of the expanded pipe end. The drawback of this solution consists in that, since bushings remain inside the expanded pipe ends, it is necessary to always have an extremely high number of bushings, namely "disposable" elements, available. This drawback is even more serious considering that hydraulic facilities may have different diameters, accordingly in order to use this solution it is necessary not only to always have a large number of bushings available, but also to have bushings with different diameters.

U.S. Pat. No. 4,308,736 A describes an expander to expand the ends of a pipe, comprising an expanding element consisting of a plurality of segments which can be expanded through an extracting element provided with a head having a double conicity, with two frustum-shaped end portions and e cylindrical central portion.

SUMMARY

The object of the present invention is to implement a device for expanding and shaping pipe ends, which ensures a reliable sealing on the expanded surface, which is simple and user-friendly, which has a limited number of components which can be easily manufactured and assembled, and which can be used without requiring a high number of "disposable" elements to be available for its operation.

A further object is to implement a device which expands pipe ends in a precise and reliable manner, without the need to provide elements suitable to be fitted into or come into contact with the outer surface of the end of the pipe to be expanded in order to monitor the extent of said expansion.

This object and other objects which will appear obvious to those skilled in the art are achieved by a device according to the pre-characterising portion of the appended claims.

BRIEF DESCRIPTION OF THE DRAWING FIGURE

For better understanding of this disclosure, drawings are herewith enclosed by way of non limiting example, wherein:

FIG. 1 shows a perspective schematic view of a device according to the invention, FIG. 2 shows an enlarged perspective schematic view of a detail, FIG. 3 to FIG. 6 show longitudinal sectional schematic views of a detail of the device in different stages of operation, FIG. 7 to FIG. 9 respectively show perspective, side and longitudinal-section schematic views of a component of the device;

DETAILED DESCRIPTION

Figure 3:
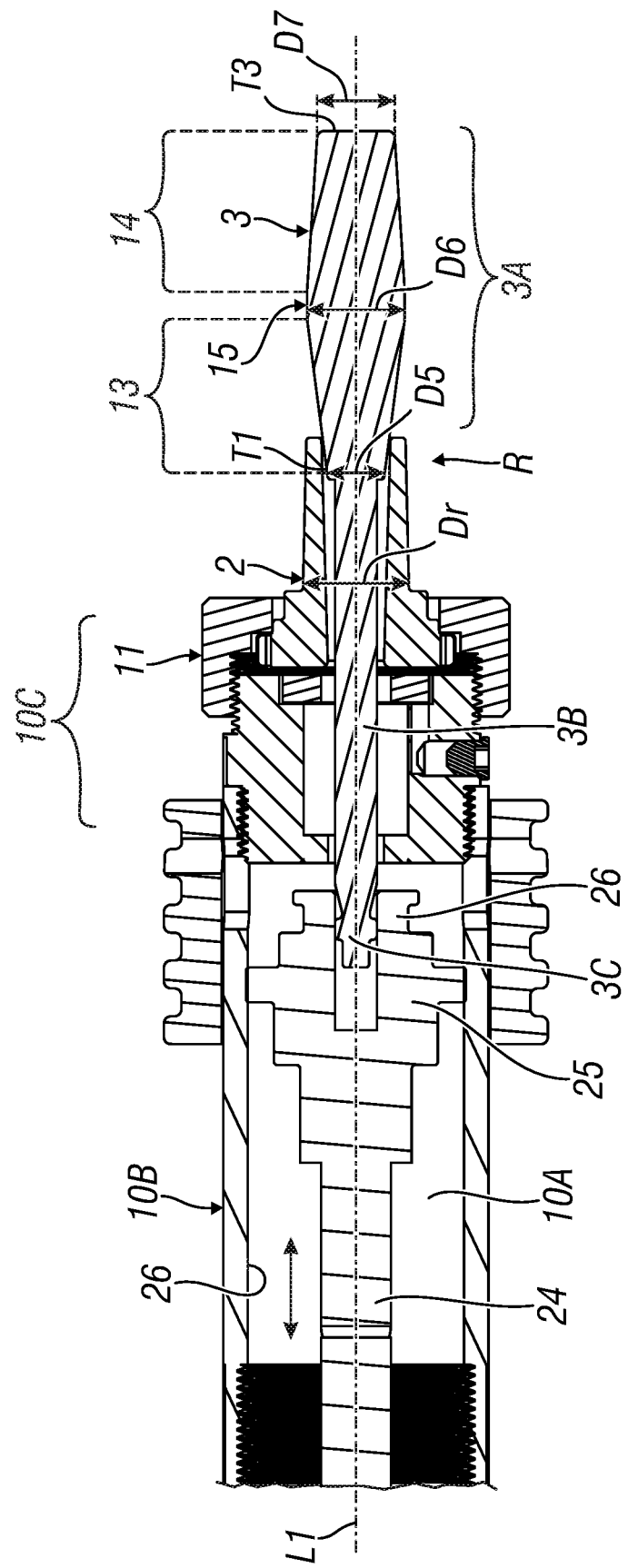

The above figures refer to a form of exemplary embodiment of a device according to the invention, suitable to expand and shape the end 1 A of a pipe 1, wherein the pipe 1 is a conventional pipe having a circular section, an internal diameter Di and an external De and is integrally or partially made of a plastic material, such as for example a multilayer material comprising at least one layer of plastic material and one layer of a metal material, such as aluminium. It is highlighted that the pipes to be shaped might even be integrally made of metal.

The pipes which can be shaped with a device according to the invention have a thickness which varies as a function of their diameter and which is included, for example, between 1 mm and 10 mm, meaning that the ratio of external diameter to thickness (SDR standard dimension ratio) is comprised between 6 and 16.

Generally, in order to shape pipe ends, it is necessary to apply a uniform force throughout the inner surface of said end, for example in a range from 80 to 120 Mpa.

The device according to the invention has a body 5 (schematically represented in FIG. 1 and having a gun shape in the illustrated example of embodiment) comprising:

an elongated element 10B having a chamber 10A (FIG. 3) suitable to at least partially house conventional moving means 4 (FIG. 1), and a head 10C comprising means 11 for removably connecting the head itself to an expanding element 2 made of an elastically deformable material.

The moving means 4 comprise, for example, a linear actuator of a conventional type for a person skilled in the art (such as a pneumatic or hydraulic or manual type) having a cylinder (not shown) and a stem 24 (FIG. 3) ending with a latching head 25, axially sliding along a keyhole 26 of the chamber 10A and along a direction corresponding to a longitudinal axis L1 of the elongated element 10B.

The latching head 25 comprises an ordinary member 27 (FIG. 3) suitable to allow latching and unlatching the linear moving means 4 of an extracting member 3 and more particularly of an end 3C (FIG. 3) of a stem 3B connected to a head 3A of the extracting member 3, described in detail hereinafter.

The expanding element 2 is a body, preferably consisting of a single piece, made of an elastically deformable plastic material, and comprising: a first elongated portion 2D, suitable to be elastically deformed in order to shape the pipe end, from one end of which a second portion 2E departs, suitable to connect said expanding element to the head 10C of the elongated element 10B of the device body 5, so that said expanding element 2 cannot move axially when it is deformed by said extracting member and also when, after the deformation of the pipe end, the expanding element is extracted from the pipe.

The elongated portion 2D of the expanding element 2 has an outer surface 2A with a maximum diameter D1 (FIG. 9) which is less than or equal to the internal diameter D2 (FIG. 4) of the end of the pipe to be shaped, so that at least said first elongated portion 2D can be introduced into said end 1A of the pipe 1. This elongated portion 2D comprises a central through hole 2B (FIG. 9) arranged coaxially to a longitudinal axis L1' of said expanding element 2 (and to the longitudinal axis L1 of the elongated element 10b of the device) and delimited by an inner surface 2C (FIG. 9).

Figure 4:
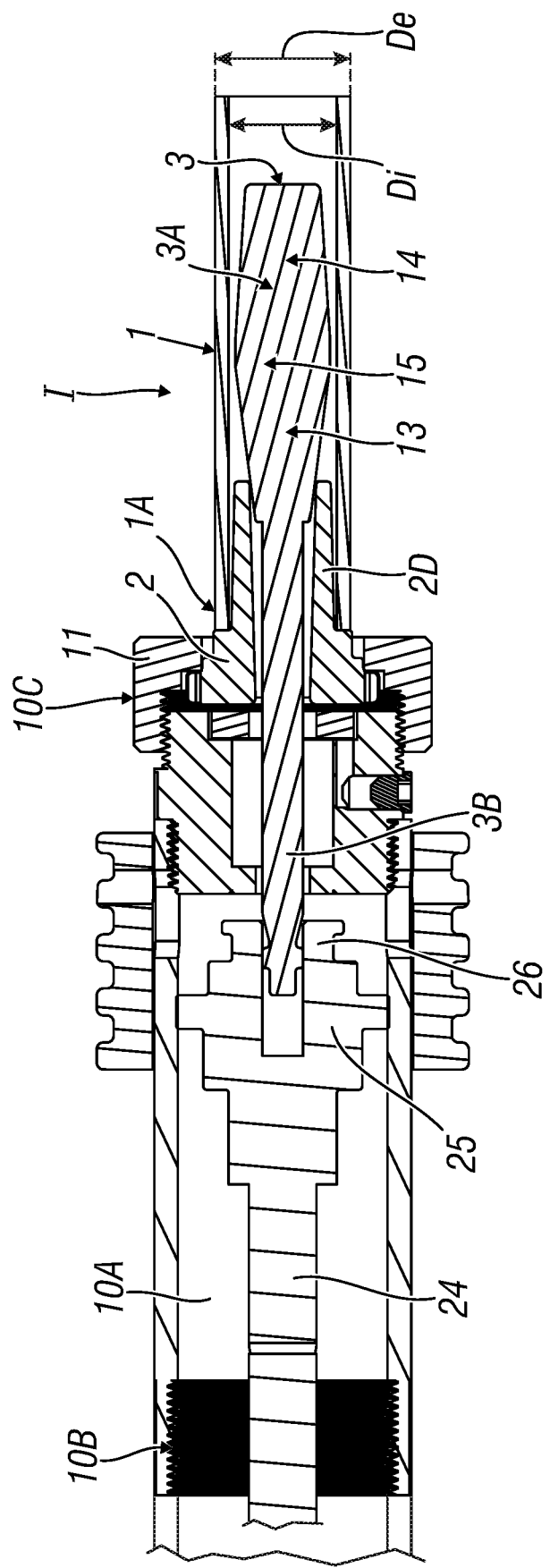
Figure 5:
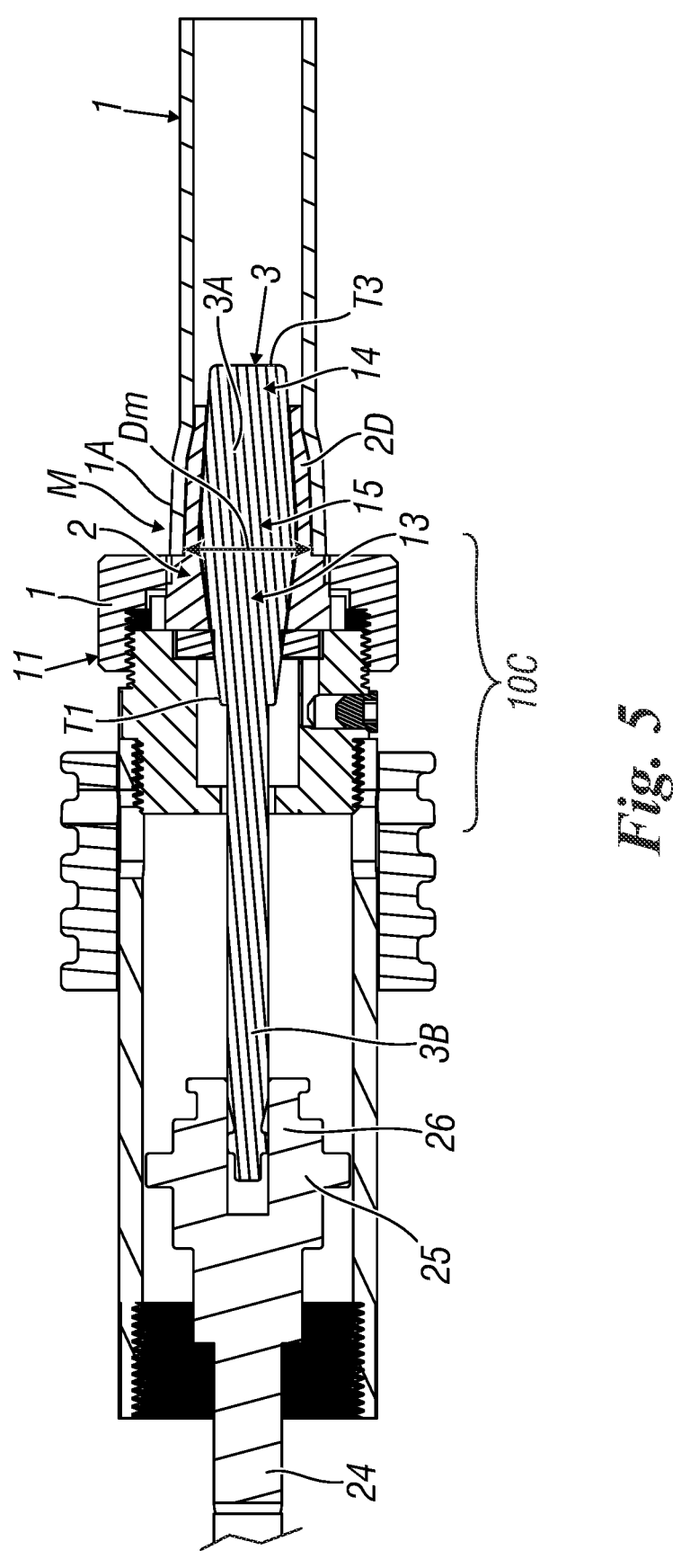
Figure 6:
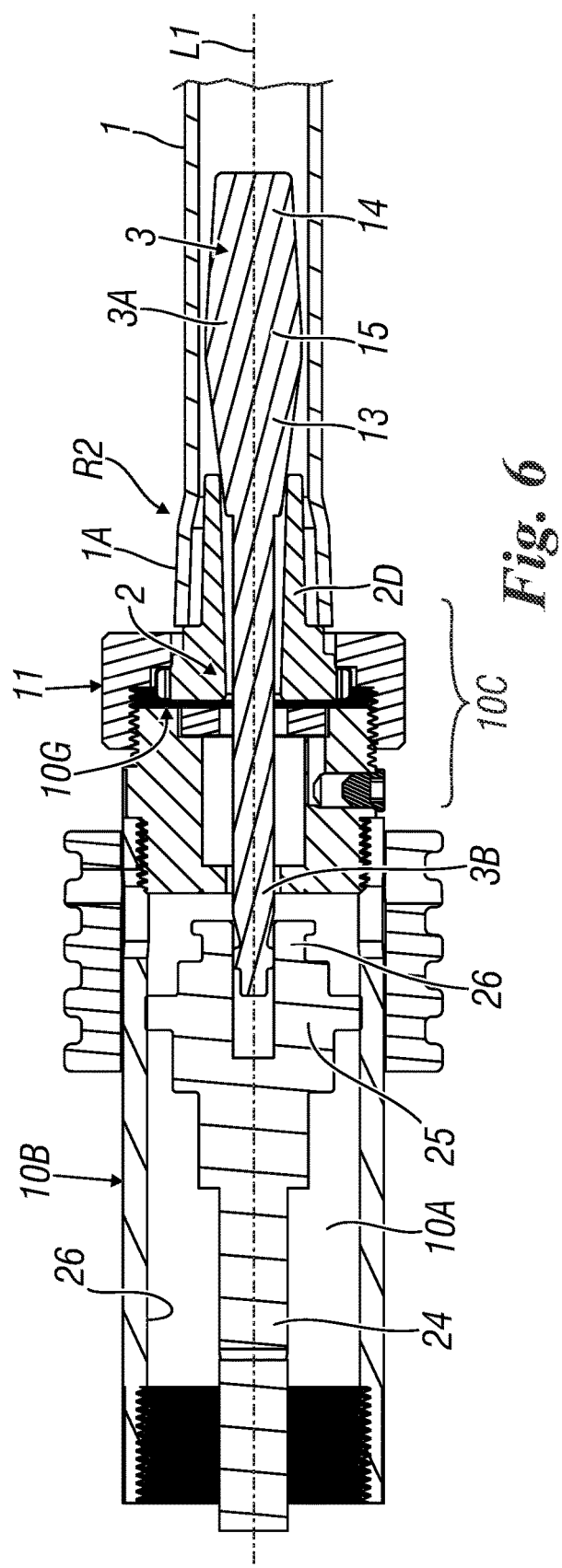
Figure 7:
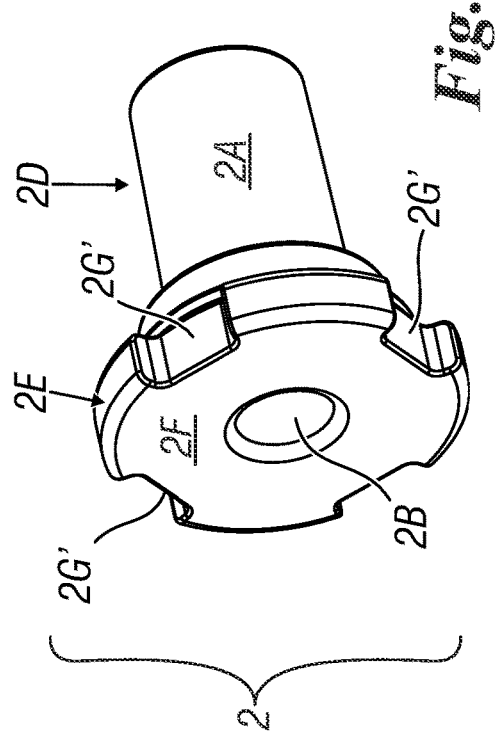

It should be highlighted that both the outer surface and the inner surface of the expanding element might also have a shape other than the one shown, for example one or both of these surfaces might have the shape of a right cylinder. The second portion 2E (FIG. 8) departs from one end of the elongated portion 2D and has, for example, a substantially discoid shape and has an inner surface 2F which is suitable to rest on an abutting surface 10G (FIG. 6 and FIG. 10) provided inside the chamber 10 A, so as to prevent the expanding element from axially moving towards the inside of said chamber when it is deformed by the extracting member 3, and an outer surface 2K suitable to act as a stop for the free edge of the pipe to be deformed and shaped (as shown in FIGS. 4-6 and in FIG. 10). At least one intermediate surface 2G 2H (FIG. 8) is provided between the external surface 2K and the internal 2F surface, suitable to act as a stop for a fastening ring 308 (FIG. 10) for the means 11 suitable to removably constrain the expanding element 2 to the device body 10.

As visible in the figures, the elongated portion 2D of the expanding element 2 protrudes from the head 10C of the device body 10 and an extremal section 3A (FIG. 2) of the extracting member 3 protrudes from the end of the elongated portion, so that both said elongated portion 2D and said extremal portion 3A of the extracting member 3 can be introduced into the end of the pipe to be expanded and shaped.

According to the invention, at least said elongated portion 2D of the expanding element 2, preferably the whole extracting member, is made of an elastically deformable polyurethane plastic material and has a hardness between 45D and 60D (as measured in compliance with DIN 53505), preferably between 50D and 55D and more preferably amounting to about 53D, so as to ensure a reliable deformation of the pipe end.

Preferably the elastically deformable polyurethane plastic material is a polyester TPU (thermoplastic polyurethane).

It has actually been experimentally ascertained that this type of plastic material has on one side the desired rigidity suitable to deform the ends of the pipes which are normally used to implement hydraulic or fluid-power or pneumatic facilities as described above, on the other side the desired elastic qualities, and it preserves said features of rigidity and elasticity for a high number of cycles of expansion and return to the original size (for example, for a number of cycles between 50 and 500 and preferably higher than 500). It has been experimentally ascertained that other materials such as for example rubber or other elastomers do not provide the performance achieved by the material according to the invention.

Preferably the elastically deformable polyurethane plastic material has an elongation at break between 400% and 600%, preferably between 450% and 550%, more preferably amounting to about 500% (as measured in compliance with DIN 53504), and/or a modulus of elasticity (stress/deformation modulus), at 300% of deformation, between 30 and 60 MPa, preferably between 35 and 55 Mpa, more preferably amounting to about 40 MPa (as measured in compliance with DIN 53504 or ISO 527). Advantageously, in order to favour the extraction of the elongated portion 2D of the expanding element 2 when said portion has deformed the end 1A of the pipe 1, the elastically deformable polyurethane plastic material, particularly the polyester TPU, is mixed with a conventional additive suitable to reduce the friction coefficient of this type of material. For example, an additive which is adapted to this purpose is a concentrate based on a salt of fatty acid, for example Calcium and/or Zinc stearate. The additive is for example a "masterbatch" consisting of a polymer "carrier" with a percentage between 2% and 9%, more preferably amounting to 5%, of stearate. Said additive is for example added to the elastically deformable polyurethane plastic material, in particular to the polyester TPU, in a percentage between 2% and 10%, preferably higher than 4%. An additive adapted to this purpose is for example the one marketed by the company COIM bearing the trademark Laripur738.

The extracting member 3 and more particularly its head 3A and its stem 3B are suitable to move, under the action of the moving means 4 inside the central trough hole 2B of the expanding element 2, coaxially to the longitudinal axis L1' of the expanding element 2. The head 3A of the extracting member has a dual function: on one side, it deforms the expanding element (when it moves towards the chamber 10A in the direction of the arrow F1 in FIG. 10) so that the latter can in its turn deform the end of the pipe to be shaped, on the other hand it contributes to extract the expanding element from the deformed pipe end (when it moves towards the outside of the chamber 10A, namely in the direction of the arrow F2 in FIG. 10).

The head 3A of the extracting member 3 is shaped so as to interfere with the inner surface 2C of the central through hole 2B of the expanding element 2, in order to radially expand the elongated portion 2D of the expanding element itself and change the maximum diameter thereof D1 between a value of said diameter at rest Dr (FIG. 3 and FIG. 10), wherein said extracting member 3 does not deform said elongated portion 2B (and the expanding element can be introduced into the end of the pipe to be deformed), and a maximum value Dm (FIG. 5), wherein there is maximum interference of said extracting member 3 with said expanding element 2 and consequently the maximum deformation of its elongated portion 2D (and of the pipe end).

Preferably, the elongated portion 2D of the expanding element 2 has an outer surface 2A which has a frustum shape opposing the frustum shape of the inner surface 2C which delimits the through hole 2*b*. More precisely:

the frustum-shaped outer surface 2A has a decreasing development towards the free end E1 of the expanding element 2, namely has an increasing diameter from the free end E1 (FIG. 9), which has a diameter D2, to the end E2, from which the other portion 2E of the expanding element 2, which has a diameter D8, departs, so that D8>D2 (the difference between the two diameters being comprised for example between 5% of D2 and 20% of D2);

and the inner surface 2C delimiting the through hole 2*b* is also frustum-shaped, but has an opposite conicity relative to the outer surface, namely has a decreasing diameter from the free end E1, which has a diameter D3, to the other end E3 (FIG. 9), which has a diameter D4, so that D3>D4 (the difference between the two diameters being comprised for example between 5% of D4 and 40% of D4).

The two above conicities can be different from each other or can also be the same.

Advantageously the head 3A of the extracting member 3 also has a dual conicity and has: a first frustum-shaped portion 13 (FIG. 3) which is closer to the expanding element 2, with an outer diameter which increases from the end T1 of the head 3A which is closer to the expanding element 2, which has a diameter D5, up to a central cylindrical portion 15 of the head 3A which has a diameter D6 which is also the maximum diameter of the head 3A, accordingly D6>D5 (the difference between the two diameters being for example comprised between +5% of D5 and +20% of D5); from the central portion 15 a second frustum-shaped portion 14 departs, whose diameter decreases towards the free end T3 of the head 3A, which has a diameter D7, accordingly D6>D7 (the difference between the two diameters being for example comprised between +5% of D7 and +40% of D7).

Advantageously the diameter D5 of the end T1 of the head 3A which is closer to the expanding element is smaller than the diameter D3 (FIG. 9) of the mouth of the expanding element, so that, when the device is in a rest position, the head 3A can already be partially inside the through hole 2B of the expanding element (as shown in FIG. 3). This favours the movement of the head 3A in the expanding element. Furthermore, the frustum-shaped surfaces of the head 3A of the extractor 3 and of the elongated portion 2D of the expanding element advantageously favour a gradual deformation of the elongated portion itself and at the same time of the pipe end, hence preventing the pipe from being damaged or incorrectly deformed; on the other hand, the shape of these components also ensures that the pipe end takes on a flared "glass" shape, well visible in FIG. 6.

Figure 11:
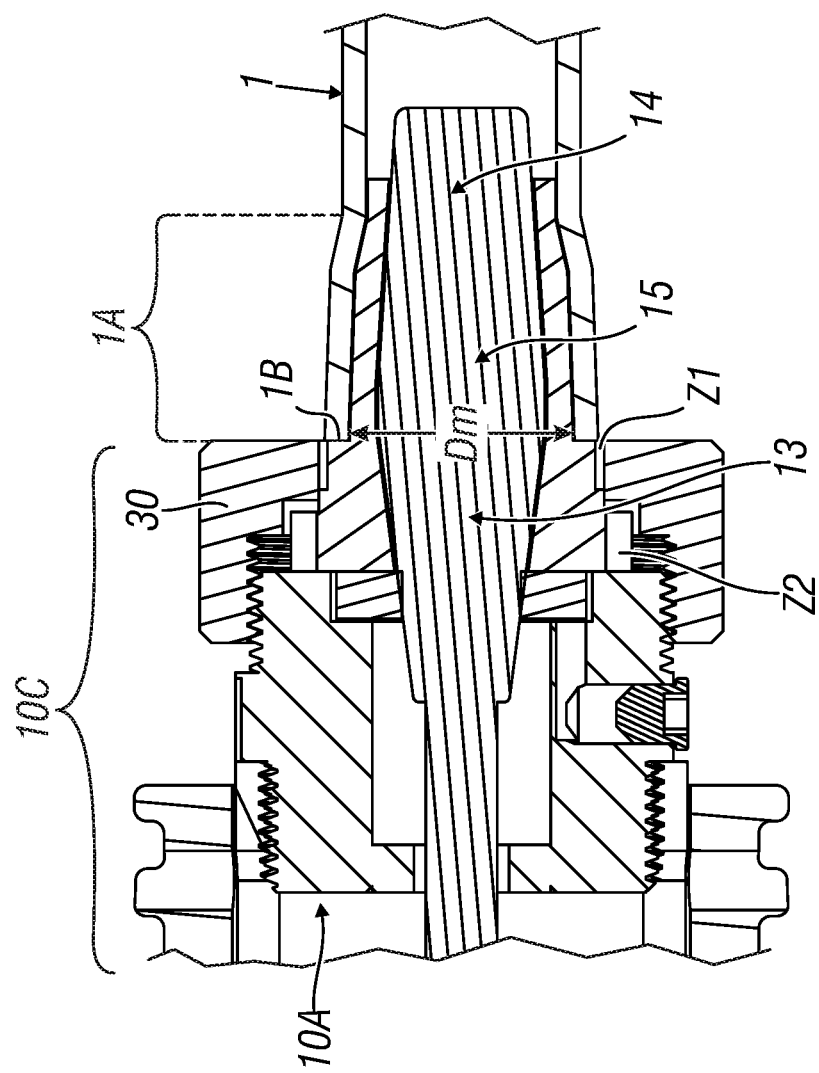

It is also highlighted that the central cylindrical portion 15 having the maximum diameter D6 (FIG. 3) of the head 3A of the extracting member is the one which determines the highest expansion of the expansion element 2, and consequently of the end 1A of the pipe 1; the stroke of the extracting member 3 must accordingly be such that this central portion 15 always reaches the free edge 1B (FIG. 11) of the end 1A of the pipe to be deformed (as shown in FIG. 11) and then reverts to the starting rest position (FIG. 4) wherein the head 3A is almost completely outside the expanding element. It is highlighted that in said return stroke it is particularly useful for the head 3A to have a dual conicity, since the presence of the frustum-shaped portion 14 favours the extraction of the central cylindrical portion 15, since what is extracted from the central through hole 2B of the expanding element is not a cylindrical portion, whose outermost free edge might get stuck against the surface 2C of the through hole 2B, but a frustum-shaped surface, which has higher ease of sliding.

It is highlighted that advantageously according to the invention the central cylindrical portion 15 of the head of the extracting member 3 preferably never goes beyond the free edge 1B (FIG. 11) of the end 1A of the pipe to be deformed during its deformation stroke towards the inside of the expanding element 2. To this end, it is particularly advantageous that immediately beyond the abutting surface 2K (FIG. 9) for the free end 1B of the pipe the thickness S1 (FIG. 9) of the expanding element is far higher (at least 30% higher) than the maximum thickness S2 of the elongated portion 2D of the expanding element 2, so that the central cylindrical portion 15 of the head 3A of the extracting member 3 cannot go beyond said abutting surface 2*k* (as highlighted in FIG. 11); this favours the extraction of the head 3A from the expanding element when the pipe end has been deformed. It is highlighted that the portion 2E of the expanding element 2 as well is deformed during the movement of the head 3A, however said deformation is due to the first frustum-shaped portion 13 of the head 3A, which has lower conicity and lower diameters compared to the other conical portion 14 of the head. Moreover, as can be noted by comparing FIGS. 10 and 11, the portion 2E is not uniformly and continuously clamped to the ring 30 removably constraining the expanding element 2 to the device body 5, but empty spaces Z1 and z2 (FIG. 10 and FIG. 11) are provided between the surfaces of said ring and the outer surface of portion 2E, which allow said portion 2E to be expanded and deformed. In addition, the portion 2E has wide windows 2G', which are also suitable to favour its deformation when the head 3A acts thereupon as well as its elastic return to the original shape when the head 3A is not acting thereupon.

The extracting member and in particular its head 3A is made of a material which is undeformable under the operating conditions of the head itself, preferably it is made of metal, for example of bronze.

Figure 10:
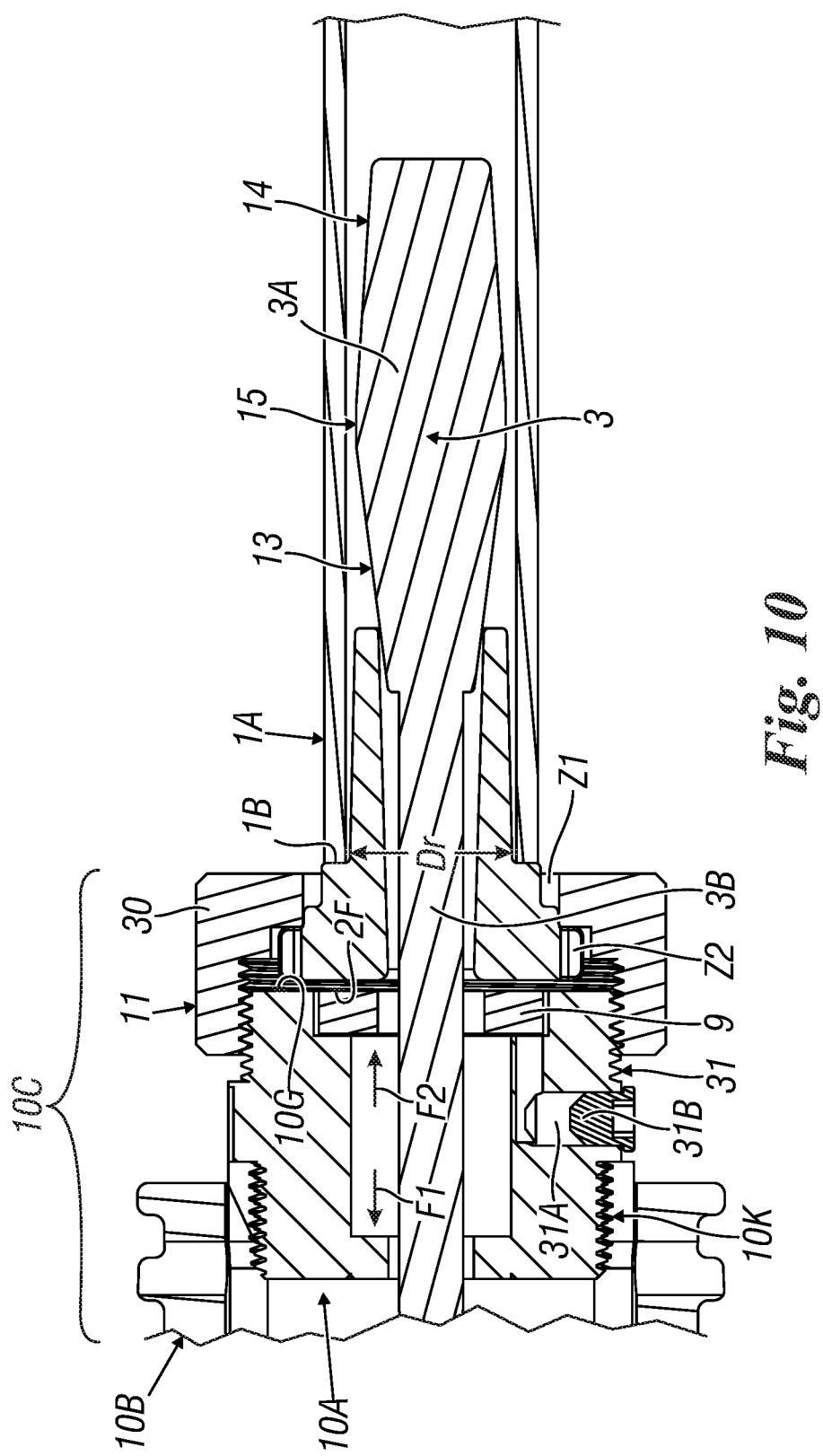
FIGS. 10 and 11 show enlarged views of details of FIGS. 4 and 6.

As shown in detail in FIG. 10, the means 11 for removably connecting the head 10C to the elongated element 10B of the device body 5, to the expanding element 2, provide a ring 30 suitable to be removably constrained (for example screwed) on a cylindrical joint 31, which in its turn is suitable to be removably constrained (for example screwed) to one end 10K of an elongated element 10B of the device body 5. The outermost ends of the joint 31 are suitable to act as a steady abutting surface 10G for the surface 2F (FIG. 8 and FIG. 10) of the expanding element 2, so that, when the latter is deformed by the extracting member, it cannot axially move towards the inside of the cylindrical joint itself (namely in the direction of the arrow F1). The ring 30 also has the function of blocking axial movements of the expanding element also towards the outside of the cylindrical joint 31 (namely in the direction of the arrow F2).

Advantageously the cylindrical joint 31 also has a hole 31A closed by a cap 31B, so as to allow a lubricant suitable to lubricate the extracting member 3 and consequently also the hole 2B of the expanding element 2 to be introduced, so as to reduce the wear of the expanding element.

The joint has a piston element 9 suitable to be filled with lubricant and to release the same little by little, so as to form a kind of lubricant tank.

The device body 5 (FIG. 1) for example has a gun shape and comprises a first portion 5A suitable to act as a handle, from which a second elongated portion comprising the elongated element 10B ending with the elastically deformable portion 2D and the head of the extracting member 3 departs on the upper side. The gun-shaped body comprises an ordinary trigger-like button 5C, suitable to control the movement of the extracting member 3, as well as ordinary devices such as a removable battery 5D to supply energy to the moving means 4 suitable to move the extracting member 3.

The device operation is as follows: firstly, the elongated element 10B is associated to a head 10C to which an expanding element 2 and an extracting member 3 are constrained, having such diameters that they can be introduced flush into the pipe end which is to be deformed and shaped into a "glass-shape". Preferably, in order to make said operation easier, the head 10C comprises the cylindrical joint 31 (FIG. 10) to which an expanding element 2, constrained to the joint by the ring 30, is already associated. After connecting the head to the elongated element, the stem 3B of the extracting member 3 is introduced into the expanding element until the free end of the stem itself automatically latches to the head 25 of the moving means 4. In this condition, advantageously the head 3 of the extracting member is already partially introduced into the through hole 2b of the expanding element 2 (as shown in FIG. 3). In this condition of the device (marked by R in FIG. 3), the expanding element is not deformed and the device is ready to be used. To this end, the expanding element and the extracting member are introduced into the end of the pipe to be deformed, as shown in FIG. 4 (this condition of the device is marked by the arrow I of FIG. 4). Acting thereafter on the button 5C, the moving means 4 are activated and will start to push the extracting member 3 towards the inside of the device (namely in the direction of the arrow F1 of FIG. 10). In this situation the head 3 of the extracting member uniformly and continuously deforms the expanding element until it reaches a state of highest deformation (marked by the arrow M of FIG. 5).

In this situation the portion 15 of the head 3A having the maximum diameter D6 is provided in correspondence with the free edge 1B of the end 1A of the pipe (FIG. 10) and the maximum diameter of the elongated portion 2D of the expanding element 2 has shifted from an initial rest value Dr (FIG. 10) to a value of highest deformation Dm (FIG. 11), wherein Dm has a length between +10% and +20% of Dr and preferably amounting to about +15% of Dr.

Now the movement of the head 3A is automatically reversed, for example through the intervention of a mechanical or electric or manual end stop which detects the position of the extracting member 3 and which is suitable to generate a control signal for the moving means 4. By reversing the movement of the extracting member 3, the relevant head 3A is shifted towards the outside of the device and the inside of the pipe 1 (namely in the direction of the arrow F2 of FIG. 10) up to its original position. In this condition, the elongated portion 2D of the expanding element 2 as well has elastically returned to its starting undeformed condition (this situation is marked by the arrow R2 in FIG. 6), whereas the end 1A of the pipe 1 remains irreversibly deformed in its "glass shape". It has been experimentally ascertained that, since the head 3A of the extraction member 3 has a dual conicity with different diameters of the two frustum-shaped sections 13 and 14, the return of the elongated portion 2D of the deforming element 2 and the separation of said portion from the deformed section 1A of the pipe 1 are favoured. The device according to the invention allows the same expanding element to be used for a plurality of deformations of pipe ends which all resemble one another, without the need for replacement (for example for a number of operations between 50 and 500). When the expanding element has to be replaced because of wear (for example because it no longer has optimal elasticity features), it will only be needed to unscrew the ring 30 (FIG. 10 and FIG. 11) and to remove the extracting member (by pushing it towards the outside of the device) so as to separate it from the head 25 and from the relevant moving means when the device is in a rest condition R (FIG. 3).

It should be pointed out that the ability to be deformed and to elastically return to the initial condition of the expanding element 2 remains unchanged for a plurality of deformation operations (for example for a number of operation between 50 and 500) and that the device according to the invention does not require additional elements adapted to monitor that the deformation of the pipe ends always occurs precisely and reliably. In actual fact, the shape and the materials of the head 3A of the extracting member 3 and those of the expanding element 2 always ensure optimal deformation and shaping of pipe ends.

It should be highlighted that the outer surface 2A of the elongated portion 2D of the expanding element 2 might also have a shape other than the one shown, for example the shape of a right circular cylinder.

It should also be highlighted that the dual-conicity head 3A of the extracting member could also be used in devices for deforming/shaping the ends of pipes having an expansion element suitable to deform the end of pipes with different features compared to those illustrated so far (for example of an ordinary kind). The invention is therefore to be understood as extending to the only form of the dual-conicity head of the extracting member described so far.

The invention accordingly also relates to: an extracting member 3 for a device for expanding and shaping the end 1A of pipes 1, comprising: an expanding element 2 made of a deformable material,
   wherein said expanding element 2 comprises a first elongated portion 2D having an outer surface 2A with a maximum diameter D1 which is less than or equal to the internal diameter D2 of the end 1A of the pipe to be expanded and shaped, so that at least said first elongated portion 2D of the expanding element can be introduced into said end 1A of the pipe 1,
   wherein said expanding element 2 comprises a central through hole 2B arranged coaxially to a longitudinal axis L1' of said expanding element 2 delimited by an inner surface 2C,
   wherein said extracting member 3 comprises an expansion head 3A suitable to move, coaxially to the longitudinal axis L1' of an expanding element 2, from the outside to the inside of a central through hole 2B of the expanding element 2 or the other way round, so as to cause a deformation of said expanding element or the other way round to allow said expanding element to return to an undeformed state,
   and wherein said device comprises means (4, 24 25 26) for moving said extracting member 3, characterised in that: the head 3A of the extracting member 3 has a dual conicity and has: a first frustum-shaped portion 13 which is closer to the expanding element 2, with an outer diameter which increases from the end T1 of the head 3A which is closer to the expanding element 2 up to a central cylindrical portion 15 of the head 3A which has the maximum diameter of the head 3A itself and from said central portion 15 a second frustum-shaped portion 14 departs, whose diameter gradually decreases towards the free end T3 of the head 3A itself, wherein preferably the diameter D5 of the end T1 of the head 3A which is closer to the expanding element is smaller than the diameter D3 of the mouth of the expanding element into which said head 3A is to be introduced to deform said expanding element 2, so that, when the device is in a rest position, the head 3A can already be partially inside the through hole 2B of the expanding element, wherein preferably the two conicities of the two parts of the head 3A are different from each other, the minimum diameter D5 of the part which is closer to the expanding element 2 being smaller than the minimum diameter D7 of the other part of the head 3A, wherein preferably the moving means for the extracting member 3 move the head 3A so that the central portion 15 of the head only reaches the free edge 1B of the end 1A of the pipe to be deformed, to be afterwards restored to its initial rest position wherein the head 3A does not deform the expanding element 2.

The invention claimed is:

1. A device for expanding and shaping the end (1A) of pipes (1), comprising:
    a head (10C) comprising means (11) for removably connecting an expanding element (2) for said end (1A) of the pipe (1) to said head (10C),
    wherein said expanding element (2) comprises:
    a first elongated portion (2D) having an outer surface (2A) with a maximum diameter (D1) which is less than or equal to the internal diameter (D2) of the end (1A) of the pipe to be expanded and shaped, so that at least said first elongated portion (2D) of the expanding element can be introduced into said end (1A) of the pipe (1),
    and a second portion (2E) rigidly connected to said first elongated portion (2D), the second portion (2E) protruding relative to an outer circumference of said elongated portion (2D), departing from one end of the elongated portion (2D), and having a substantially discoid shape,
    said second protruding portion (2E) having:
    an inner extremal surface (2F) which rests on an abutting surface (10G) of the head (10C) of the device, so as to prevent the expanding element (2) from axially moving towards the inside of said head (10C) when it is deformed,
    and an outer extremal surface (2K) which is parallel to the inner extremal surface (2F), the outer extremal surface suitable to act as a stop for a free edge (1B) of the end (1A) of the pipe to be deformed and shaped;
    wherein said expanding element (2) comprises a central through hole (2B) arranged coaxially to a longitudinal axis (L1') of said expanding element (2) and delimited by an inner surface (2C) of the expanding element (2), said device also comprising:
    an extracting member (3) comprising an expansion head (3A) suitable to move, coaxially to the longitudinal axis (L1') of said expanding element (2), from the outside to the inside of said central through hole (2B) of the expanding element (2) so as to cause a deformation of said expanding element (2), and from the inside to the outside of said central through hole (2B) to allow said expanding element (2) to elastically return to an undeformed state,
    and means (4, 24 25 26) for moving said extracting member (3),
    characterised in that:
    the means (11) suitable for removably connecting the expanding element (2) to the head (10C) of the device comprise a fastening means (30) which stops against at least one intermediate surface (2G, 2H) of the expanding element (2) provided between the inner (2F) and the outer (2K) extremal surfaces of the protruding portion (2E) of the expanding element (2), the fastening means (30) suitable to keep said protruding portion (2E) of the expanding element (2) and the expanding element itself, bound to said head (10C) of the device for a plurality of succeeding deforming and shaping operations on respective ends of a plurality of different pipes (1), so as to keep the expanding element (2) rigidly constrained to the head (10C) of the device when said device is to be used to deform and shape the end of a pipe and when said expanding element (2) is to be extracted from the deformed and shaped end (1A) of the pipe (1),
    in that said fastening means (30) is removably constrained to an outer circumferential surface defined at a first end of a junction element (31) for said head (10C) so as to allow said expanding element (2) to be replaced when said expanding element (2) is worn out, the junction element (31) having said abutting surface (10G) defined on a free end thereof facing the free edge of the end of the pipe to be deformed and shaped, a second end of the junction element (31) defining an outer circumferential surface removably constrained to a body (5) of the device,
    in that at least said elongated portion (2D) of the expanding element (2) and at least one portion of the expansion head (3A) of said extracting member (3) protrude from said head (10C) of the device in an axially forward direction with respect to said junction element (31), so that the at least said elongated portion (2D) and at least one portion of the expansion head (3A) can be introduced into the end of the pipe to be expanded and shaped,
    in that the expanding element (2) for said end (1A) of the pipe is made of an elastically deformable material,
    and in that at least said elongated portion (2D) of the expanding element (2) is made of an elastically deformable polyurethane plastic material, having:
    a hardness between 45D and 60D,
    and an elongation at break between 400% and 600%, and/or a modulus of elasticity, at 300% of deformation, between 30 and 60 MPa.

2. A device according to claim 1, characterised in that the elastically deformable polyurethane plastic material is a polyester TPU (thermoplastic polyurethane).

3. A device according to claim 1, characterised in that the elastically deformable polyurethane plastic material is mixed with an additive suitable to reduce the coefficient of friction of said plastic material, said additive being added to the elastically deformable polyurethane plastic material in a percentage between 2% and 10%.

4. A device according to claim 3, characterised in that the additive is a concentrate based on a salt of fatty acid.

5. A device according to claim 1, characterised in that the device is configured to deform and shape the end (1A) of the pipe (1) by only the expanding element (2) of the device coming into contact with the end (1A) of the pipe (1).

6. A device according to claim 1, characterised in that the outer surface (2A) of the elongated portion (2D) of the expanding element (2) is shaped as a frustum, the outer surface (2A) of the elongated portion (2D) opposing a frustum shape of the inner surface (2C) which delimits the through hole (2B).

7. A device according to claim 6, characterised in that the frustum-shaped outer surface (2A) has a decreasing development towards a free end (E1) of the expanding element (2); and in that the inner surface (2C) delimiting the through hole (2B) has an increasing development towards the free end (E1) of the expanding element (2) with the expanding element (2) in the undeformed state.

8. A device according to claim 1, characterised in that the head (3A) of the extracting member (3) has a dual conicity and has: a first frustum-shaped portion (13) which is closer to the expanding element (2), with an outer diameter which increases from the end (T1) of the head (3A) which is closer to the expanding element (2) up to a central cylindrical portion (15) of the head (3A) which has the maximum diameter of the head (3) itself, and in that from said central portion (15) a second frustum-shaped portion (14) departs, whose diameter gradually decreases towards the free end (T3) of the head (3A) itself, in that the diameter (D5) of the end (T1) of the head (3A) which is closer to the expanding element is smaller than the diameter (D3) of a mouth of the expanding element into which said head (3A) is to be introduced to deform said expanding element (2), so that when the device is in a rest position, the head (3A) extends partially inside the through hole (2B) of the expanding element, and in that the two conicities of the head (3A) are different from each other, the diameter (D5) of the end which is closer to the expanding element (2) being smaller than a diameter (D7) of the free end (T3) of the head (3A).

9. A device according to claim 8, characterised in that the moving means for the extracting member (3) move the head (3A) so that the central portion (15) of the head only reaches an axial location corresponding to the free edge (1B) of the end (1A) of the pipe to be deformed and shaped, the head (3A) configured to be afterwards restored to an initial rest position wherein the head (3A) does not deform the expanding element (2).

10. A device according to claim 1, characterised in that the elongated portion (2D) of the expanding element (2) elastically varies its maximum diameter (D6) from an initial rest position diameter (Dr) when the head (3A) of the extracting member does not deform said expanding element (2), to a maximum deformation diameter (Dm) when the head (3A) of the extracting member (3) deforms said expanding element (2) to the highest extent, wherein said maximum deformation diameter (Dm) has a length between +10% and +20% of the length of the initial rest position diameter (Dr).

11. A device according to claim 1, characterised in that the fastening means is an annular element (30).

12. A device according to claim 1, characterised in that the fastening means is an annular element (30) and in that the junction element for the device body is a cylindrical joint (31), the annular element (30) being suitable to be removably connected on said cylindrical joint (31), and the cylindrical joint (31) being suitable to be removably constrained to one end (10K) of an elongated element (10B) of the device body (5).

13. A device according to claim 1, characterised in that immediately beyond the outer extremal surface (2K) of the protruding portion (2E) of the expanding element (2), the thickness (S1) of the expanding element (2) is higher than the maximum thickness (S2) of the elongated portion (2D) of the expanding element (2), said higher thickness (S1) being at least 30% higher than the maximum thickness (S2) of the elongated portion (2D).

14. A device according to claim 1, characterised in that the head (3A) of the extracting member (3) at least partially deforms also the protruding portion (2E) of the expansion element (2) while the head is being moved in order to expand the end (1A) of the pipe (1).

15. A device according to claim 1, characterised in that, when the fastening means (30) keeps the protruding portion (2E) of the expanding element (2) bound to the head (10C) of the device, empty spaces are provided between opposing surfaces of said fastening means and said protruding portion (2E), which empty spaces allow said protruding portion (2E) to be expanded and deformed.

16. A device according to claim 1, characterised in that the protruding portion (2E) of the expanding element (2) has windows (2G') which are suitable to favour its elastic deformation when the head (3) is acting thereupon as well as its elastic return to the undeformed state when said head is not acting thereupon.

* * * * *